United States Patent

Dymond

[11] Patent Number: 5,886,435
[45] Date of Patent: Mar. 23, 1999

[54] REDUCTION OF WINDAGE NOISE IN DYNAMOELECTRIC MACHINES

[76] Inventor: James Henry Dymond, 982 Cumberland Ave., Peterborough, Ontario, Canada, K9H 7B2

[21] Appl. No.: 944,031

[22] Filed: Sep. 24, 1997

Related U.S. Application Data

[63] Continuation-in-part of Ser. No. 562,810, Nov. 27, 1995, abandoned.

[51] Int. Cl.$^6$ .................................................... H02K 9/00
[52] U.S. Cl. ............................................ 310/65; 310/51
[58] Field of Search ........................... 310/65, 251, 216, 310/64, 51, 211

[56] References Cited

U.S. PATENT DOCUMENTS

| 925,271 | 6/1909 | Behrend ................................ 310/65 |
| 3,171,996 | 3/1965 | Alger et al. ............................. 310/65 |

*Primary Examiner*—Thomas M. Dougherty
*Assistant Examiner*—K.I.E. Tamni
*Attorney, Agent, or Firm*—Edward H Oldham

[57] ABSTRACT

This apparatus is directed to reduction in emitted windage sound in dynamoelectric machines by detuning cavities formed in the ventilation spaces of the machine.

8 Claims, 4 Drawing Sheets

REDUCTION OF WINDAGE NOISE IN DYNAMOELECTRIC MACHINES

This application is a continuation-in-part of U.S. patent application Ser. No. 08/562,810 filed Nov. 27, 1995 now abandoned.

This invention relates to the reduction of emitted noise in a dynamoelectric machine produced by ventilating air passing through the various parts of the machine.

It is necessary that most dynamoelectric machines be cooled by circulating cooling air through the various parts of the machine. The rotor and stator are usually fabricated by assembling groups of magnetic laminations which have been stamped out in predetermined shapes and arranged in groups which are periodically spaced from each other by a ventilation duct, that is a metallic sheet of the same shape as the laminations adjacent to the ventilation duct, but the ventilation duct usually will have small beam-like spacers attached to it extending radially to keep the adjacent groups of magnetic laminations from contacting each other, thus the ventilation duct is merely a device having a generally annular shape which separates groups of laminations in the stator and rotor cores of a dynamoelectric machine.

The rotor and stator are usually assembled so that the ventilation spacers of the rotor and stator are in radial alignment in the assembled machine.

In a standard configuration, the rotor is assembled on a multi-armed supporting member usually referred to as a spider. The laminations and their periodically spaced ventilation spacers are assembled on the spider so that air may enter the rotor from either end and be pulled into the middle of the hollow spider where the ventilation air is expelled through the various ventilation duct spaces by the centrifugal radial fan action produced by the rotating ventilation duct and its radial beam-like spacers. The air then passes radially outwardly, past the winding embedded in the axially extending rotor slots near the surface of the rotor, and through the air gap and into ventilation spaces directly opposite the rotor ventilation spaces. The air must then pass the stator windings which are located in the axially extending slots in the stator and then through the ducts formed in the stator ventilation spaces by the radially beam-like spacers.

The air which is pumped by the rotor removes heat from the laminations which undergo heating caused by hysteresis and eddy current losses, and from the windings embedded in the slots which produce heat due to copper losses, part of which is transferred to the laminations in which they are locked so that the winding heat may be partially dissipated in the laminations and transferred to the air passing there through.

The driving force for the ventilating air is the rotor and designers have sought to place the beam-like spacers which extend in a general radial direction in a manner similar to spokes in a wheel in such an orientation as to maximize the radial pumping action of the rotor to ensure the maximum cooling of the motor core. (In certain applications, motor designers may utilize axial fans mounted on the rotor shaft adjacent to the rotor core and spider to augment air flow through the motor.)

The obstructions to the air flow in the rotor and stator are the windings past which air must flow in order to make its passage out of the rotor. Air must flow past the rotor windings and into the stator through the ventilation spaces in the stator between the stator windings.

The stator windings produce a peculiar phenomenon in conjunction with the air flow in that the air which is passing out of the spaces between the windings tends to flow in a continuous stream but is chopped into small bursts as it passes into the adjacent spaces in the stator laminations caused by an interruption of air flow as the rotor air stream encounters a stator winding, and then an air space. It is this phenomena which causes pulsations in the air flow across the gap which produce rarifications and condensations of the air stream which gives rise to a "sound" whose frequency is determined by the number of windings in the rotor and the rotational speed of the rotor within the stator.

Thus the forcing function for the production of the "sound" is the air moving across the air gap, which the designer is attempting to maximize to give the "best" available cooling. The stator is provided with spacers which aid in improving the scrubbing action of the ventilating air through various portions of the stator ventilating system.

The noise generated by the rotors of induction machines has a particular frequency which is determined by the rotor construction. Each rotor duct allows the air admitted to the interior of the spider to escape between the rotor bars as the rotor spins. If the spinning rotor is not confined in a stator, the air escaping the rotor produces no pronounced frequency sound, that is a "rush of air" sound similar to a fan is heard. If, however, the spinning rotor is enclosed in a stator wherein the ventilation ducts of the stator and rotor are aligned, an entirely different situation exists wherein the column of air exiting from between the stator bars no longer is unobstructed. Each time the column of air exiting between a pair of rotor bars encounters a stator bar in the adjacent stator duct, a compression of the moving air column in the rotor occurs. As soon as the rotor moves so that the two ducts (i.e. stator and rotor) are aligned, a rarification of the moving column may occur. As expected the rotating rotor is able to generate a sound, which, in certain instances may be overpowering and annoying. The sound will have a particular pitch depending on the speed of the rotor and the intensity of the emitted sound will also vary with rotor speed.

The frequency F of the sound produced by the air column exiting through the rotor slots during rotation of the rotor is referred to as a forcing frequency or a passing frequency (rotor slots passing stator bars) and is easily calculated from the following equation:

$$F_R = \frac{RN}{60} \text{ Hz}$$

where F is the forcing or passing frequency caused by the rotor slots passing the stator bars during rotation of the rotor;

R is the number of rotor slots;

N is the rotor speed in rpm.

The sound emitted from the machine will depend on the physical dimensions of the machine especially the "active" length of the stator and rotor ducts. Both ducts are able to function as open organ pipes and can produce significant amplification of the emitted sound at particular rotor speeds and sound frequencies.

Because most induction machines are designed to operate at a particular speed, it is important to design the lengths of the rotor and stator ducts to reduce emitted sound level to an acceptable level.

As soon as the design parameters of the machine are frozen, i.e. speed and the number of rotor slots, the frequency of emitted sound is known and great care must be taken to produce rotor and stator duct lengths which will not reinforce the frequency of the sound produced by the rotating rotor. This is done by choosing the lengths of the rotor and stator air duct passages such as to reduce the opportunities for resonant conditions to exist.

The prior art machines utilize air passages which are formed by the radially extending beam-like members which are strategically placed at discrete intervals to maximize the air flow through the stator. The rotor and stator ventilation ducts are usually radially aligned so as to produce a minimum pressure drop across the stator and rotor cores. This maximizes the air flow and the resultant cooling of the motor. However, the rotor and stator ducts may tend to function as "open" or "closed at one end" organ pipes if the length of the crude organ pipes are about one half or one quarter wavelength of the frequency of the sound being forced into the system by the rotating rotor. In certain situations, a resonant system may be produced which will serve to amplify the sound produced by the rotating rotor and stator.

PRIOR ART

The main method used in the past to control the response of the air duct to the rotor passing frequency was to make sure that the stator ventilation slots were such that the slot length of the ventilation space and the punching depth, and the punching yoke length were not equal to the full, half, or quarter wavelength of the passing frequency. This was done by arrangements shown in FIGS. 2, 3, 5, 6, 7, 8 and 9.

U.S. Pat. No. 3,171,996 to Alger et al seeks to reduce the emitted noise from induction motors by determining the wavelength of the rotor passing frequency and producing stator air ducts of a size and configuration which are of such length so as not to resonate at the passing frequency.

Another technique useful in controlling the noise emitted by induction machinery is found in Canadian Patent No. 619,621 to Dorsey et al and issued May 9, 1961. This patent reduced the level of sound emitted by offsetting the rotor and stator ducts in the axial direction. Grooves maybe provided on the rotor or stator air ducts to provide more diffusion of the air columns arriving at the stator air ducts.

This method will serve to lessen the emitted sound on high speed induction motors, but does have some limitations. Because of the increased air gap, the power factor tends to be reduced, the efficiency is also slightly reduced which leads to increased heat production in the motor and hence an increase in motor size. In certain applications, air gap sparking is experienced and this phenomena tends to limit the application of motors utilizing the construction embodied in the above Canadian Patent to particular applications.

While it is recognized that the emitted noise of dynamoelectric machines result from other stimuli, such as axial fans mounted on the rotor shaft magnetostriction, and bearing rotation, this application is concerned only with the reduction of the noise generated by the ventilation medium passing through the machine during operation.

SUMMARY OF THE INVENTION

It has been found that by precisely locating the beam-like members attached to the ventilation punchings in the rotor and stator laminations so as to prevent resonant conditions developing in either the rotor or stator ventilation spaces, that the emitted noise can be substantially reduced during operation of the dynamoelectric machine. Particular attention must be paid to the size and shape of the spaces produced by the beam-like members attached to the ventilation lamination. Resonant chambers of such shape that are odd and even multiples of quarter wavelengths of the rotor passing frequency are to be carefully avoided. To do so, one may design the chambers in the stator and rotor to be resonant at a frequency significantly different from the passing frequency. The adjusted resonant frequencies of rotor and stator need not be the same.

Sound reduction may also be accomplished by assuring that breaks are present in the beam-like spacers that are attached to the ventilation spacer laminations in the rotor and stator.

To ensure that a complete break occurs in the sound wave produced at the passing frequency, the spacing between any of the in-line beam like members must be equal to at least one eighth of the wavelength but less than one quarter of the wavelength of the rotor passing frequency. The space block lengths should not be equal to the full, half, or quarter wavelength of the rotor forcing frequency. Other precautions will be included in the following description with the aid of the drawings.

DESCRIPTION OF PREFERRED EMBODIMENT

Figure 1:
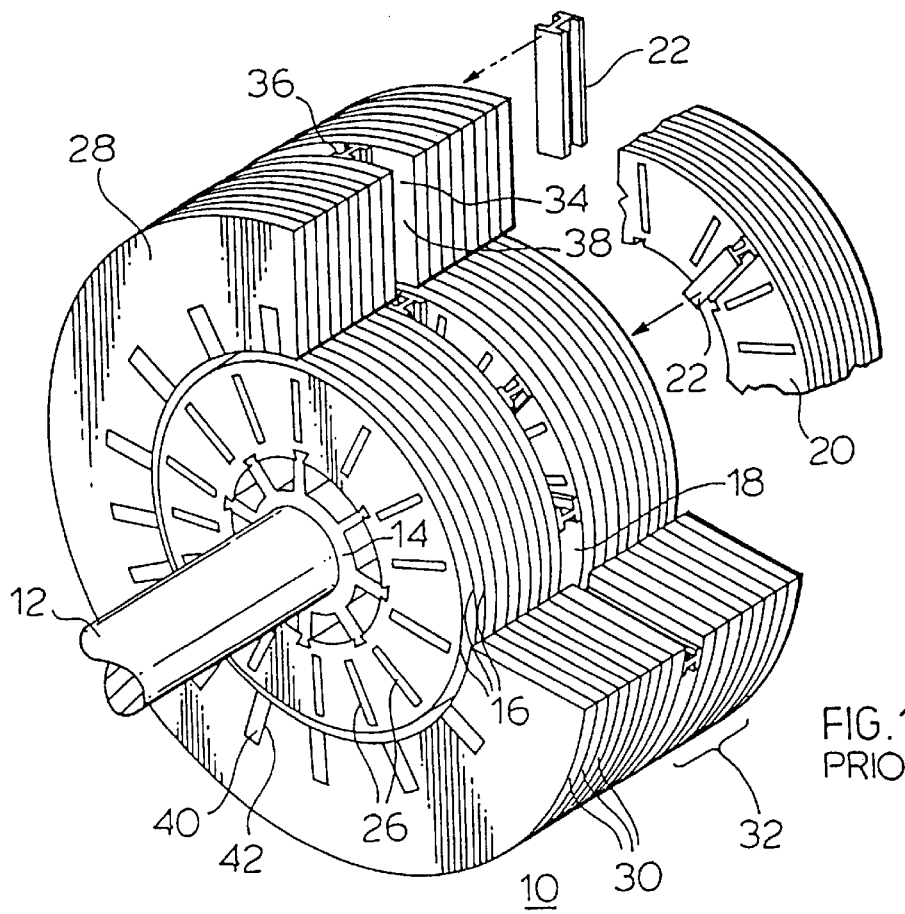
FIG. 1 is a partial section of a perspective view of a prior art dynamoelectric machine showing the structure and associated ventilation laminations.

Referring now to FIG. 1 where a representation of an induction motor 10 is shown, a shaft 12 serves as a suitable mounting member for spider 14 which is permanently secured to shaft 12. Mounted on spider 14 are a series of laminations shown as 16 which are formed into groups or packets and separated by ventilation spaces 18 formed by a spacer stamping, part of one of which is shown at 20 to which beam like members (space blocks) 22 are attached by welding or some other suitable method of joining.

A set of rotor windings 26 are shown passing through the rotor laminations at 16. In this instance, the rotor windings are shown as bars having an elongated rectangular cross sectional shape but it is understood that the windings 26 may take many alternative shapes depending on the end application of the motor being constructed.

Shaft 12 is mounted in suitable bearings (not shown) to allow the shaft, spider laminations, and windings to rotate inside stator 28. The stator is fabricated from packets 32 of laminations 30 which are stacked together in a frame (not shown) to produce a unitary structure having ventilation spaces 34 which are usually located opposite the ventilation spaces 18 in the rotor.

The method of providing ventilation spaces 34 in the stator is very similar to the method used in the rotor, i.e. beams 36 are attached to a spacer stamping 38 which has the same shape as the stator laminations 30. Usually beams 38 are mounted on the ventilation stampings such as 38 so as to be in a radial orientation when installed in the stator lamination stacks 32. Windings 40 are located in the stator lots 42 of the stator core 28.

The stator 28 when complete, rests in a frame (not shown) as a unitary body which is mounted in an enclosure to provide protection and ventilation paths for the rotor and stator of the completed assembly.

Figure 2:
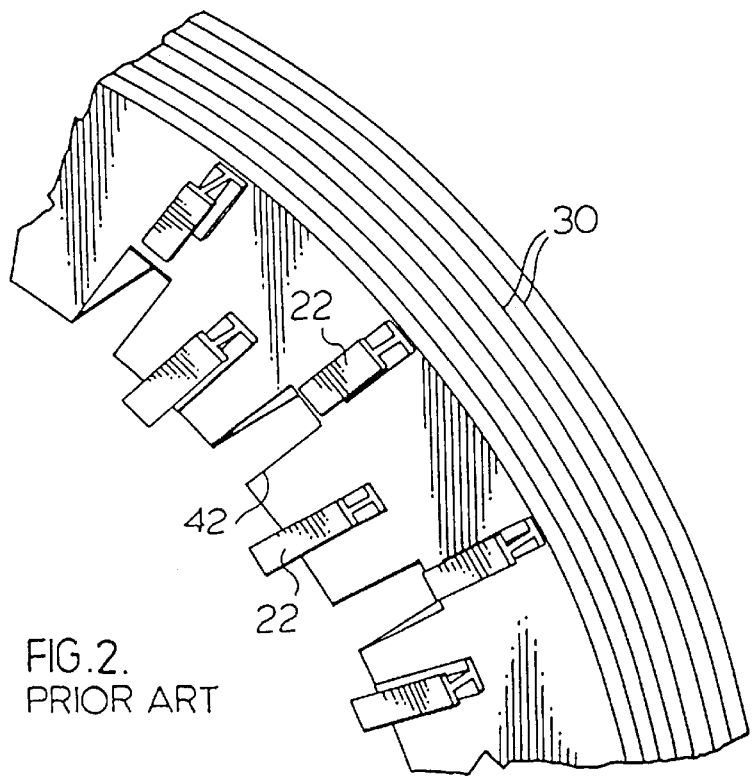
FIG. 2 is a section of a prior art ventilation spacer system showing the placement of spacer beams.

FIG. 2 shows a perspective view of a portion of a stator construction showing the placing of the spacers on the ventilation stampings used in prior art constructions. Laminations 30 are shown having winding slots 42 for stator windings (not shown). Ventilation spacers 22 are strategically placed above the winding slots 42 and midway between the winding slots 42. Note that this construction provides excellent directivity to the cooling air passing through the stator, but the windage noise produced by this construction may be excessive.

Figure 3:
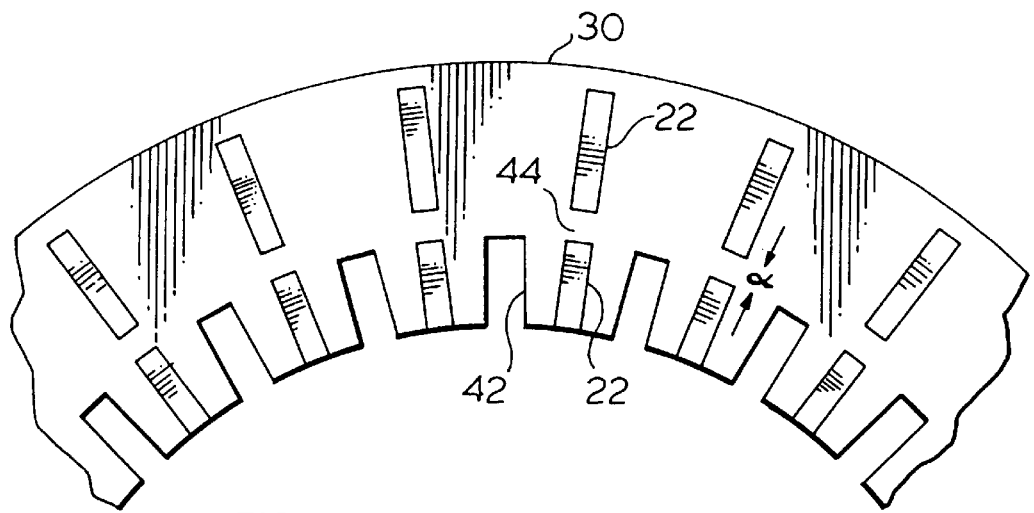
FIG. 3 is a section of a prior art ventilation spacer system showing an alternate placing of spacer beams.

FIG. 3 shows a construction for placing the spacer beams 22 directly between the stator winding slots 42 in a prior art construction. In this instance, the beams 22 are separated by a space 44 designated as "∝" in an effort to reduce the windage noise produced by the completed motor. If the length of the beams 22 and the spaces 44 are not carefully chosen, excessive noise results.

Figure 4:
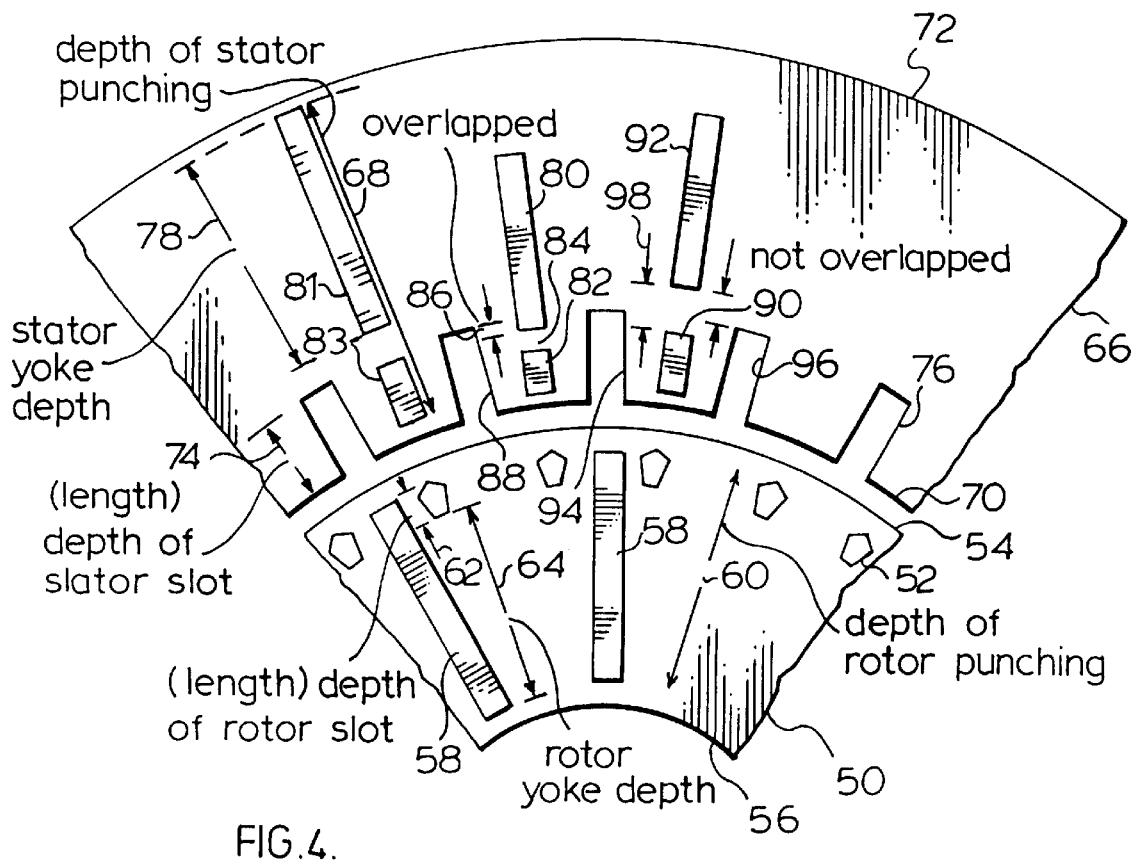
FIG. 4 is a section of a ventilation system showing the various critical dimensions and locations of various components in the ventilation system.

FIG. 4 is a representation of a section of the stator and rotor of an induction motor to illustrate the various parameters which are of significant importance to applicant's invention. In this illustration, a rotor lamination 50 is shown having rotor winding slots 52 stamped therein. The rotor punching has an exterior surface 54 and an interior surface 56. The interior surface 56 of rotor is secured to a spider assembly. The spacer beams 58 are shown placed between alternate rotor winding slots 52. In FIG. 4, the following distances are important to the understanding of the applicant's invention:

Depth of rotor punching shown at 60, this being the entire radial depth of the rotor punching, occupied by the space block (in this instance) 58.

Depth of rotor winding slot shown at 62 on FIG. 4 and is the radial length of the winding slot from top to bottom of slot.

Depth of rotor yoke shown at 64 on FIG. 4 which is the radial distance from the bottom of the rotor winding slot to the bottom of the space block (in this instance) 58.

For the stator punching 66, the following definitions are pertinent to applicant's invention:

Depth of stator punching 68 which is the radial distance from the most interior surface of space block 83 (in this instance) to the most exterior surface of space block 81 (in this instance).

Depth of stator winding slot is shown at 74 and is the radial distance from the top to the bottom of the winding slot 76.

Depth of stator yoke is shown at 78 and is the radial distance from the bottom of the slot 76 to the most exterior surface of the space block 81 (in this instance).

Spacers 80 and 82 are shown for illustrative purposes only and as shown in FIG. 4, the spacers are spaced midway between the winding slots 76. A space 84 is shown between spacer 80 and 82. Outer spacer member 80 is shown having an "overlap" 86 with winding slot 88.

A pair of spacers 90 and 92 are shown located midway between a pair of stator winding slots 94 and 96. In this instance, the spacers 90 and 92 are spaced apart a distance 98. Notice that there must be no "overlap" between the spacer 92 and the stator winding slots 94 and 96 for purposes of this application.

Figure 5:
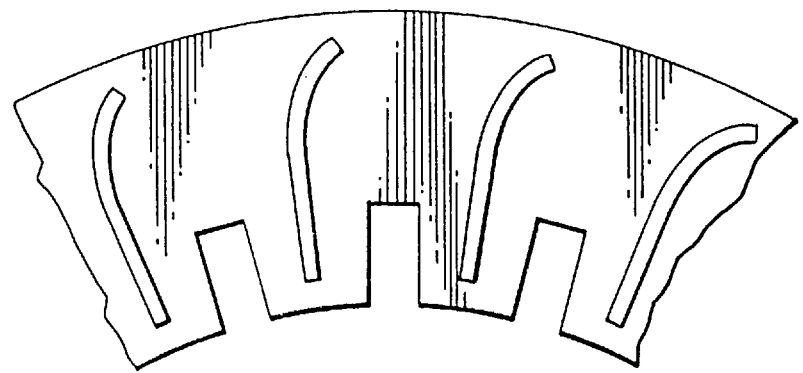
FIGS. 5, 6, 7, 8 and 9 show variations in spacers in ventilation ducts of the prior art.

In order to reduce the windage noise produced in dynamoelectric machines, the spacers in the stator have taken peculiar shapes by curving the spacers so that the spacer does not extend radially outwardly but curves to produce a change in direction of the air passing through the stator ventilation slots. See FIG. 5 for a representative section of a stator and the associated curved ventilation spacers for a prior art structure.

Figure 6:
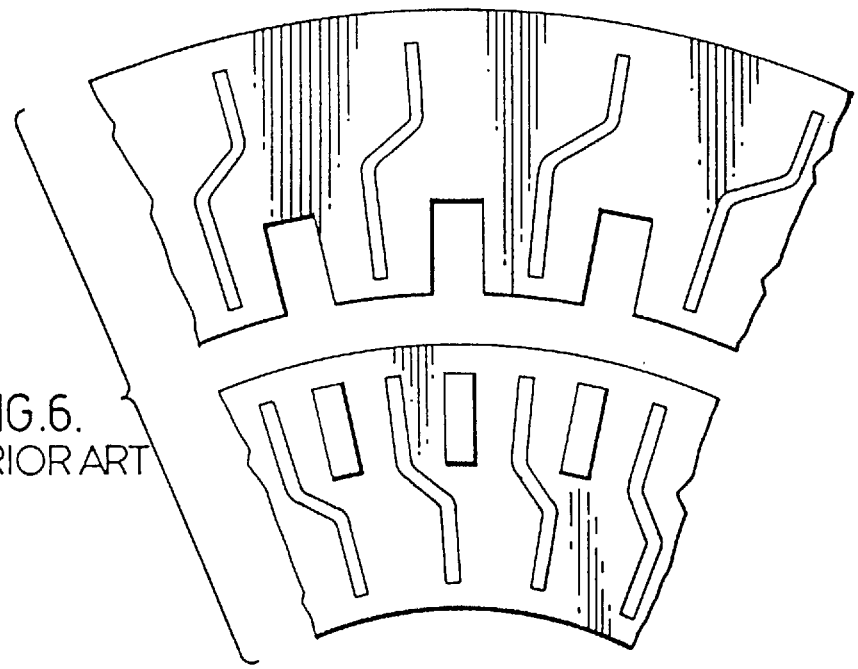

In some instances, an offset is placed in the rotor and stator spacers to improve the mechanical rigidity of ventilation spacer and in effect cause a deflection of the air stream as it passes through the rotor and stator ventilation ducts. See FIG. 6 for a representative section of a prior art rotor and stator having offset ventilation spacers.

Figure 7:
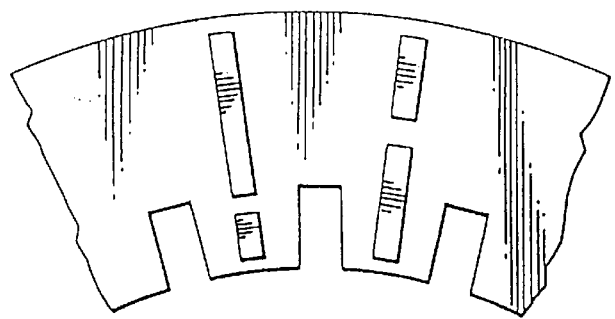
Figure 8:
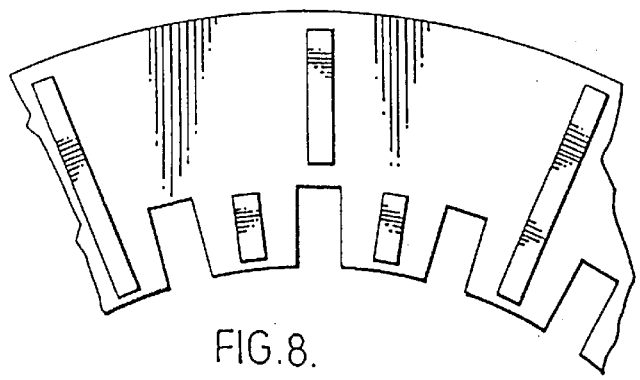

Various other prior art methods have been used to control windage noise which include offsetting the spaces between the radially extending spacers as shown in FIG. 7 and staggering the location of the spacers as shown in FIG. 8.

Figure 9:
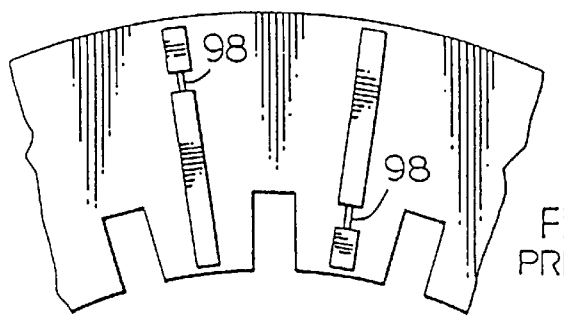

In some instances, notches are cut in the spacers to effectively "change" the length of the spacer. See FIG. 9.

In each of the above referenced Prior Art illustrations, many conditions will be found to exist where effective windage noise control was not achieved.

In any dynamoelectric machine, the following parameters are generally determined by the electrical designer in order to meet the ultimate specifications of the machine. There are:

rotor and stator punching depths, rotor and stator yoke depths, rotor and stator winding depths number of rotor windings.

Once these parameters have been fixed by the designer, the rotor passing frequency is determined as are the critical machine lengths. The only adjustment left to the designer for noise control is the placement of rotor and stator ventilation spacers. The judicious selection of the length and placement of such spacers to effectively detune any resonant chambers crudely formed by the spacers and winding structure of the machine, will next be described.

The fundamental rule to be observed is that the spacers must be placed such that the effective length of any chambers formed by the ventilation spacers and the windings of stator and rotor must not form any chambers which are multiples of quarter wavelengths of the rotor passing frequency. This is done by choosing a placement and spacing of space blocks which eliminate the production of sound chambers, the dimensions of which would give rise to chambers of full, half or quarter wavelength of the passing frequency.

Thus, for example, if a radial spacer system is used where the stator punching depth approximates a quarter, half or full wavelength or a multiple thereof, the spacer must be discontinuous so that an "effective" space of approximately one eighth of the wavelength of the passing frequency is produced to provide a "break" in the chamber.

Figure 10:
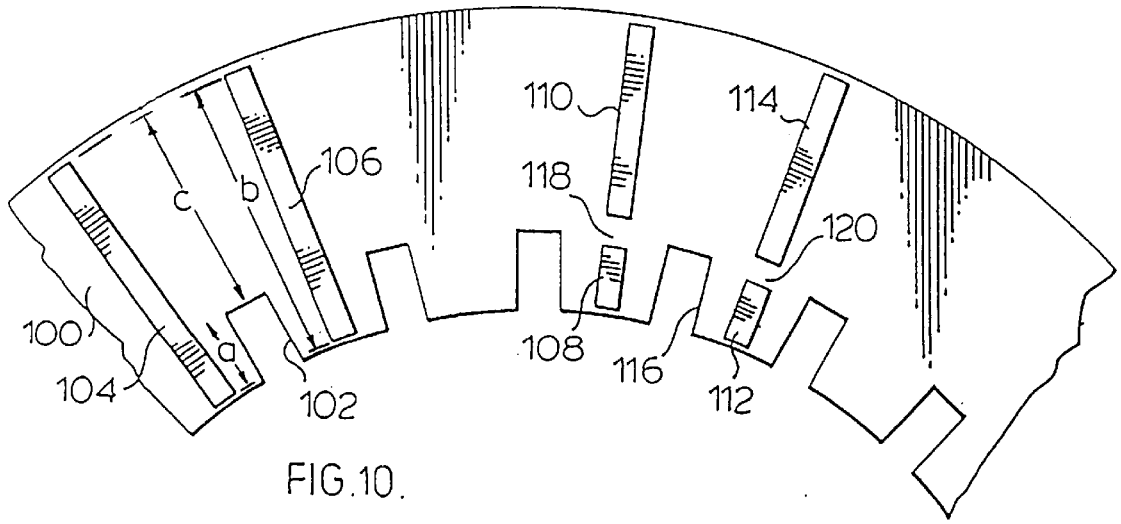
FIG. 10 shows the critical dimensions for the determination and elimination of sound resonant chambers in a ventilation duct system.

Referring to FIG. 10 wherein a representative section of a stator lamination 100 is shown, stator winding slots 102 are shown, separated by spacers 104 and 106. Assuming that the entire ventilation space is constructed as shown on the left hand side of FIG. 10, that is with a spacer beam such as 104 or 106 inserted between each winding slot such as 102, the resulting structure must be carefully scrutinized to determine whether or not any of the dimensions a, b, or c as shown in FIG. 10, is equal to a full, half, or quarter wavelength of the passing frequency. If the dimension "a" in FIG. 10 is say a quarter wavelength of the rotor passing frequency, the chamber formed by the winding and spacer 104 may be effectively broken up by the construction shown by spacers 108, 110, 112 and 114 as shown surrounding slot 116. The breaks 118 and 120 in spacers must be in length at least one eighth of the wavelength of the rotor passing frequency in order to assure that the resonant chamber is effectively destroyed. Of course, if the other dimensions b and c are suspect in producing resonant chamber, breaks in the ventilation spacers 110 and 114 may be necessary to avoid excessive windage noise.

Thus, a method of controlling the windage noise in dynamoelectric machines has been provided by the judicious placement of spacer members of specific lengths and having breaks of a specific lengths in the spacers to effectively detune any resonant chambers which might have been inadvertently produced in the machine by the machine's inherent dimensions.

The method of controlling windage noise described above requires that the rotor passing frequency be calculated, and then determining the resulting wavelength of the sound produced by that rotor passing frequency. If any resonant conditions are found to exist in the resultant structure formed in the rotor or stator ventilation slots, the strategy for detuning the resonant chambers is quite straight forward. The suspected resonant chambers may be detuned by applying the principles outlined above. Strategic breaks in the lengths of the spacer members will lead to a definite decrease in the sound produced in the stator. The presence of resonance chambers in the rotor is as serious as the presence of resonant chamber in the stator. Care should be taken to explore the ventilation structure of the rotor for resonant conditions. Remedial action similar to the action taken to detune the stator ventilation structure must be undertaken for the rotor. The above methods may be advantageously employed to effectively detune the rotor and stator structure for resonant cavities formed at the passing frequency.

When the term, quarter, half or full wavelength are used herein, care must be taken to ascertain that multiples of the above wavelengths are not present in the resultant ventilation structure.

The motor designer is to be cautioned that open ended organ pipe theory has proven that the effective anti-node exists slightly beyond the end of the open ended organ pipe. This means that physical motor structure which produces resonant conditions will include chambers whose dimensions are just slightly less than the critical quarter, half or full wavelengths defined by the passing frequency.

Calculations are exactly the same for the rotor parameters as is done for the stator parameters to detune any resonant chambers found in the rotor.

I claim:

1. A dynamoelectric machine comprising:
   a stator,
   a rotor suitably mounted within said stator for rotation therein, said rotor and stator having an air gap there between,
   said stator and rotor each having a magnetic core assembly and having a plurality of conductor bars comprising a winding passing through each magnetic core adjacent said air gap,
   said rotor and stator each having space blocks located in each core to produce opposing ventilation ducts axially spaced so as to permit the outward radial flow of air in said ducts during rotation of said rotor,
   said air in said rotor ducts being subjected to pressure pulsations due to the passage of rotor air ducts past the stator conductor bars during rotation of said rotor to produce a sound of a particular frequency and wavelength,
   said space blocks in said rotor having a length and position to produce ducts in said rotor having a resonant response to a sound frequency significantly different from said particular frequency.

2. A dynamoelectric machine as claimed in claim 1 wherein the space blocks in the stator are of such length as to produce stator ducts having a resonant response to a sound frequency significantly different from said particular frequency.

3. A low noise dynamoelectric machine comprising a stator and a rotor for rotation within said stator,
   said rotor and stator each having a magnetic core comprising stacks of laminations through which conductor bars pass to comprise a winding,
   each core having radially disposed air ducts formed by suitable space blocks, said ducts being periodically spaced in said laminations to permit the radial flow of air outwardly from the rotor into the stator,
   said air in the rotor ducts being subject to pressure pulsations of a particular frequency to produce a sound during rotation of said rotor within said stator,
   said sound being produced due to the passage of air in said rotor ventilation ducts passing the conductor bars of said stator,
   the rotor space blocks having a predetermined length and position to reduce the resonant response of the rotor air ducts to frequency of said pressure pulsations.

4. A low noise dynamoelectric machine as claimed in claim 3 wherein the space blocks in said stator are of such length as to reduce the response of the stator ventilation ducts to the frequency of the sound produced by said rotor.

5. A method of controlling sound generated by rotation of a rotor within a stator of a dynamoelectric machine (DEM) which has the following structure:
   a rotor comprising groups of annular laminations forming packets mounted on a shaft such that the packets of laminations are separated from each other by ventilation ducts formed by spacer beams of a first length mounted radially at first spaced predetermined locations in each ventilation duct, said packets also having slots formed therein for receiving rotor bars, and wherein said bars and beams form a rotor ventilation duct having the following critical dimensions in the ventilation ducts:
   rotor slot depth=A
   rotor yoke depth=B
   rotor punching depth=C;
   a stator comprising groups of annular laminations forming packets and having a set of stator windings mounted in slots in said stator laminations and wherein said packets of laminations are separated by ventilation ducts, each ventilation duct formed by spacer beams of a second length mounted radially at second spaced predetermined locations in each ventilation duct, and wherein said windings and beams form a stator ventilation duct having the following critical dimensions:
   stator slot depth=X
   stator yoke depth=Y
   stator punching depth=Z
   calculating the rotor passing frequency of said sound produced by said DEM determining the resulting wavelength of the rotor passing frequency,
   examining the rotor and stator ventilation ducts and spacer beam locations to determine if any of the various dimensions A, B, C, X, Y, Z are such as to produce any sound resonant chambers in the ventilation ducts of the rotor or stator, adjusting the lengths and locations of said beams in said rotor and stator ventilation ducts so as to detune any sound resonant chambers in said rotor or stator ventilation ducts.

6. A method as claimed in claim 5 wherein breaks are provided in the beams in the ventilation ducts to detune any resonant chambers in the rotor or stator and which breaks are of a length of approximately one eighth of the wavelength of the rotor passing frequency.

7. A dynamoelectric machine having a stator and a rotor separated by an air gap mounted in housing for rotation of said rotor within said housing, said rotor and stator being constructed from stacks of laminations arranged in packets being securely fastened together to form integral units, said laminations having rotor and stator windings located in winding slots provided therein, said rotor and stator packets being separated by spacer blocks to form ventilation ducts in said rotor and stator, said ventilation ducts of said rotor and stator being arranged to be mutually opposed on each side of the air gap between the rotor and stator, the rotor ventilation ducts producing a rotor sound passing frequency during operation of said machine, said spacer blocks in said rotor and stator being constructed to effectively detune any resultant sound resonant chambers in said rotor and said stator ventilation ducts by providing breaks in said spacer blocks at appropriate locations of a length dependent on said rotor passing frequency.

8. A dynamoelectric machine as claimed in claim 4 wherein the space blocks are arranged so that no overlap occurs between the space blocks and the winding slots.

* * * * *